(12) United States Patent
Kirschey

(10) Patent No.: US 7,568,976 B2
(45) Date of Patent: Aug. 4, 2009

(54) ROTARY COUPLING

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 229 days.

(21) Appl. No.: 10/992,634

(22) Filed: Nov. 18, 2004

(65) Prior Publication Data

US 2006/0058104 A1   Mar. 16, 2006

(30) Foreign Application Priority Data

Sep. 10, 2004   (DE) ................... 20 2004 014 280 U

(51) Int. Cl.
*F16D 3/70* (2006.01)
(52) U.S. Cl. .......................................... 464/71; 464/93
(58) Field of Classification Search .................. 464/71, 464/72, 137, 138, 93, 69, 182, 184, 98; 403/1
See application file for complete search history.

(56) References Cited

U.S. PATENT DOCUMENTS

| | | | | |
|---|---|---|---|---|
| 1,204,925 A * | 11/1916 | Aldrich | ........................ | 464/71 |
| 2,089,786 A * | 8/1937 | Esson | ........................ | 464/71 |
| 2,453,383 A * | 11/1948 | Gilbert | ........................ | 464/72 |
| 2,565,606 A * | 8/1951 | Guy | ........................ | 464/72 |
| 3,222,885 A * | 12/1965 | Hein | ........................ | 464/71 |
| 3,422,637 A * | 1/1969 | Kelley | ........................ | 464/93 |
| 3,861,172 A * | 1/1975 | Symann | ................ | 464/93 X |
| 3,897,859 A * | 8/1975 | Norcia | ........................ | 464/71 |
| 4,385,893 A * | 5/1983 | Kirschey | | |
| 4,515,573 A * | 5/1985 | Eichinger | ................... | 464/71 |
| 5,489,240 A * | 2/1996 | Kirschey | | |
| 5,586,938 A * | 12/1996 | Schurhorster | ............ | 464/98 X |
| 5,601,168 A * | 2/1997 | Hayashi et al. | ............... | 464/71 |
| 6,176,784 B1 * | 1/2001 | Albers | ........................ | 464/93 |
| 6,203,434 B1 * | 3/2001 | Albers | ........................ | 464/93 |
| 6,371,858 B2 * | 4/2002 | Albers | ........................ | 464/93 |
| 2003/0050123 A1 * | 3/2003 | Kuczera | ..................... | 464/93 |
| 2005/0137021 A1 * | 6/2005 | Juranko | ..................... | 464/71 |

OTHER PUBLICATIONS

Universal Joint and Driveshaft Design Manual, AE-7, Society of Automotive Engineers, Inc., Warendale, PA, p. 179, TJ1079.S62 1979.*

* cited by examiner

*Primary Examiner*—Greg Binda
(74) *Attorney, Agent, or Firm*—Andrew Wilford

(57) ABSTRACT

A coupling connects a drive part with a driven part. One of the parts are formed with axially extending coupling formations. The coupling has a one-piece plastic body formed with a central hub formed with axially extending coupling formations complementary to the formations of the one part and fitted axially to the one part and with a plurality of connection regions projecting radially from the hub securable to the other of the parts. Each of the connection regions is formed with an axially throughgoing hole. The coupling further has respective metallic elements fitted in the holes and each fixed to the other part. These elements fit with play in the respective holes. Formations on the elements and on the connection regions secure the elements in the connection regions against displacement out of the connection regions in either of two axially opposite directions prior to fixing of the elements to the other part.

13 Claims, 3 Drawing Sheets

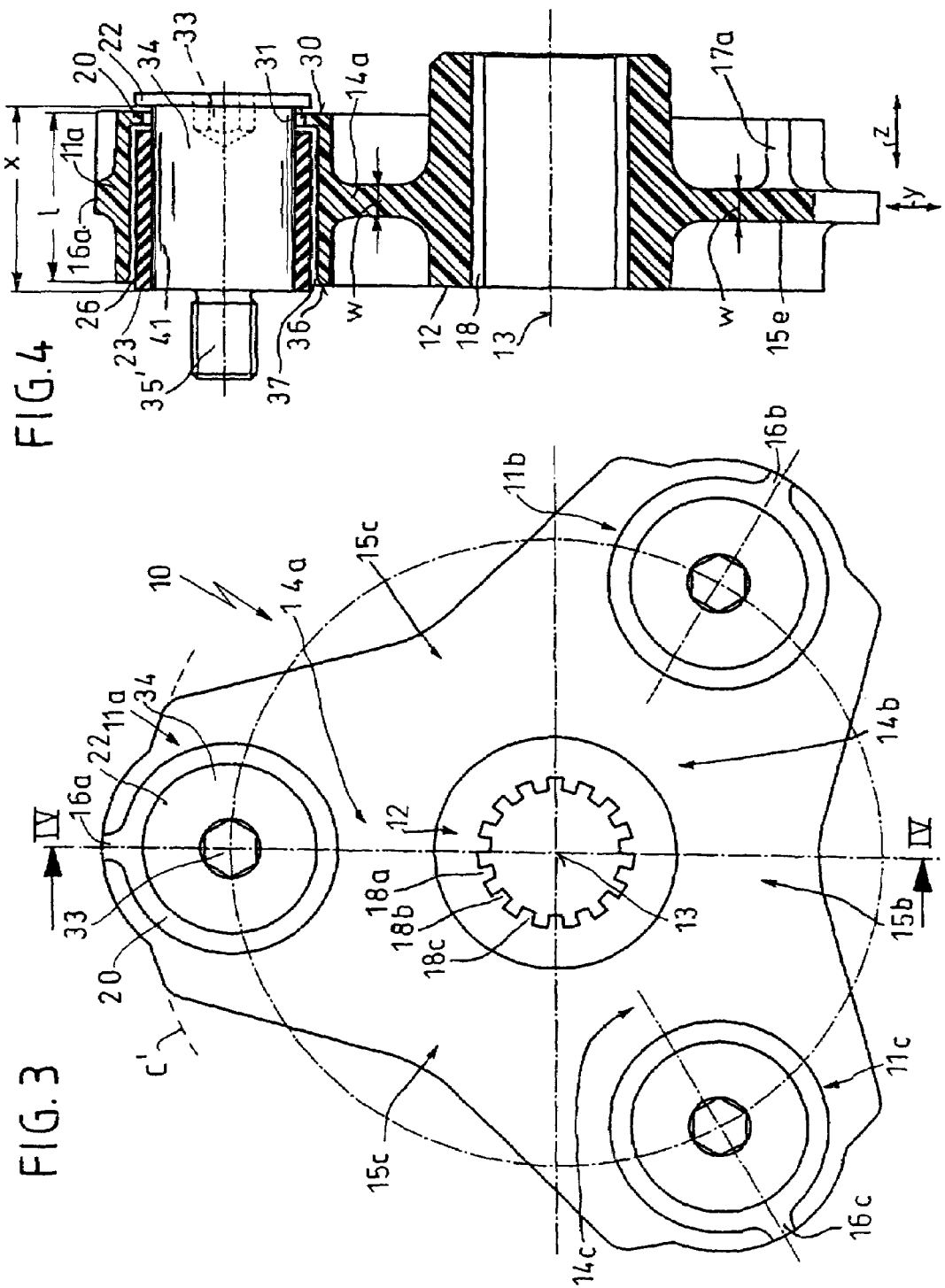

ROTARY COUPLING

FIELD OF THE INVENTION

The present invention relates to a rotary coupling. More particularly this invention concerns such a coupling designed to rotationally couple a drive element. e.g. a flywheel, to a driven element, e.g. a shaft of a hydrostatic pump.

BACKGROUND OF THE INVENTION

A standard coupling as described in application Ser. No. 10/387,124 filed 12 Mar. 2003 (now US Pat. No. 6,846,241) has an inner ring centered on an axis, an outer ring surrounding and generally coaxial with the inner ring, and an intermediate ring generally coaxial with and between the inner ring and outer ring. A pair of mainly angularly extending, flexible, and parallel inner links have inner ends attached at respective locations to an outer periphery of the inner ring and outer ends attached at respective locations to an inner periphery of the intermediate ring, and a pair of mainly angularly extending, flexible, and parallel outer links have inner ends attached at respective locations to an outer periphery of the intermediate ring and outer ends attached at respective locations to an inner periphery of the outer ring. The outer links extend transversely of the inner links, and the rings and links are unitarily formed with one another.

Thus with this arrangement there are two basic systems that compensate for misalignments of the driving and driven parts which are attached to the inner and outer rings. Deflections perpendicular to the inner links are compensated for by their deformation, and deflections perpendicular to the outer links are compensated for by their deformation. Deflections diagonal to the links are compensated for by deformations of all of them. The provision of the intermediate ring ensures complete noninterference between the inner and outer links while allowing the coupling disk according to the invention to transmit considerable torque.

Another known type marketed as a type K Centaflex coupling has a plastic body in which there is a central metallic hub surrounded by an annular array of cast-in-place metal sleeves. Another prior-art such assembly is described in *Kupplunasatlas* (A. Schalitz; A. G. T. Verlag Georg Thum; 4th edition 1975.) Bolts extending through the sleeves secure the coupling to a flywheel or the like and a shaft is fitted to the hub. A complex screw clamp is provided to hold the metallic hub in place. Such a coupling is expensive to produce. In addition it is delivered to the user as several pieces that must be assembled on the site.

OBJECTS OF THE INVENTION

It is therefore an object of the present invention to provide an improved rotary coupling.

Another object is the provision of such an improved rotary coupling that overcomes the above-given disadvantages, in particular that is of simple construction, and that is in effect a single piece when delivered to the installer.

SUMMARY OF THE INVENTION

A coupling connects a drive part rotating about a drive-part axis with a driven part rotating about a driven-part axis generally coaxial with the drive-part axis. One of the parts are formed with axially extending coupling formations. The coupling has according to the invention a one-piece plastic body formed with a central hub formed with axially extending coupling formations complementary to the formations of the one part and fitted axially to the one part and with a plurality of connections regions or lobes projecting radially from the hub securable to the other of the parts.

Each of the lobes according to the invention is formed with an axially throughgoing hole. The coupling further has according to the invention respective metallic elements fitted in the holes and each fixed to the other part. These elements fit with play in the respective holes.

According to another feature of the invention formations on the elements and on the lobes secure the elements in the lobes against displacement out of the lobes in either of two axially opposite directions prior to and/or after fixing of the elements to the other part. Thus the coupling disk, which is a wear part that is occasionally replaced, is delivered to the user as a simple easy-to-handle unit, in effect one piece. In reality the elements that are bolted to the flywheel are somewhat loose in the disk so that they can easily be aligned and bolted down, but they are still mounted such that they cannot separate from the disk prior to installation. This makes replacement of such a coupling a fairly simple task.

The rotary coupling further has according to the invention respective elastic bodies formed as sleeves snugly fitted to the metallic elements. The sleeves constitute the formations on the elements securing the elements in the holes. The elements each have radially projecting formations that prevent them from shifting in one axial direction out of the respective holes, and the sleeves prevent them from moving in the opposite axial direction. These sleeves extend axially from the formations on the lobes securing the elements in the holes. In addition the formations on the lobes securing the elements in the holes project inward in the respective holes and are axially engageable with the respective sleeves. A radially inwardly projecting rim at one end of the passage through the lobe forms the lobe formations.

The bodies are received with axial and radial play in the respective holes as described above and have formations blocking axial movement of the respective sleeve on the body away from the other part sufficient for separation of the elements. More particularly each body has an axial length between an end engageable with the other part and the respective formation blocking axial movement of the respective sleeve away from the other part. The elements are metallic sleeves and each include a bolt engageable through the respective sleeve with the other part. Alternately the elements are each unitarily formed with a threaded bolt engageable in the other part.

The hub and the one part in accordance with the invention are formed with axially extending interengaging formations rotationally coupling the hub to the one part. In particular, the hub and lobes are integrally formed of one piece of plastic and the hub formations are made of this plastic, typically as splines permitting limited axial shifting between the hub and the one part. Thus the part, typically a splined steel shaft, fitted to the hub is not likely to get frozen in place, as is possible when the hub has a steel liner fitting with a steel shaft, so that both can rust together.

To maximize strength, reinforcing ribs rigidly secure the hub to the lobes Further ribs may be provided at the lobes to stiffen them. These ribs are integrally formed of plastic with the hub and lobes.

BRIEF DESCRIPTION OF THE DRAWING

The above and other objects, features, and advantages will become more readily apparent from the following description, reference being made to the accompanying drawing in which:

FIG. 3 is a view like FIG. 1 of a variant on the structure of FIG. 1; and

FIG. 4 is section taken along line IV-IV of FIG. 3.

SPECIFIC DESCRIPTION

Figure 1:
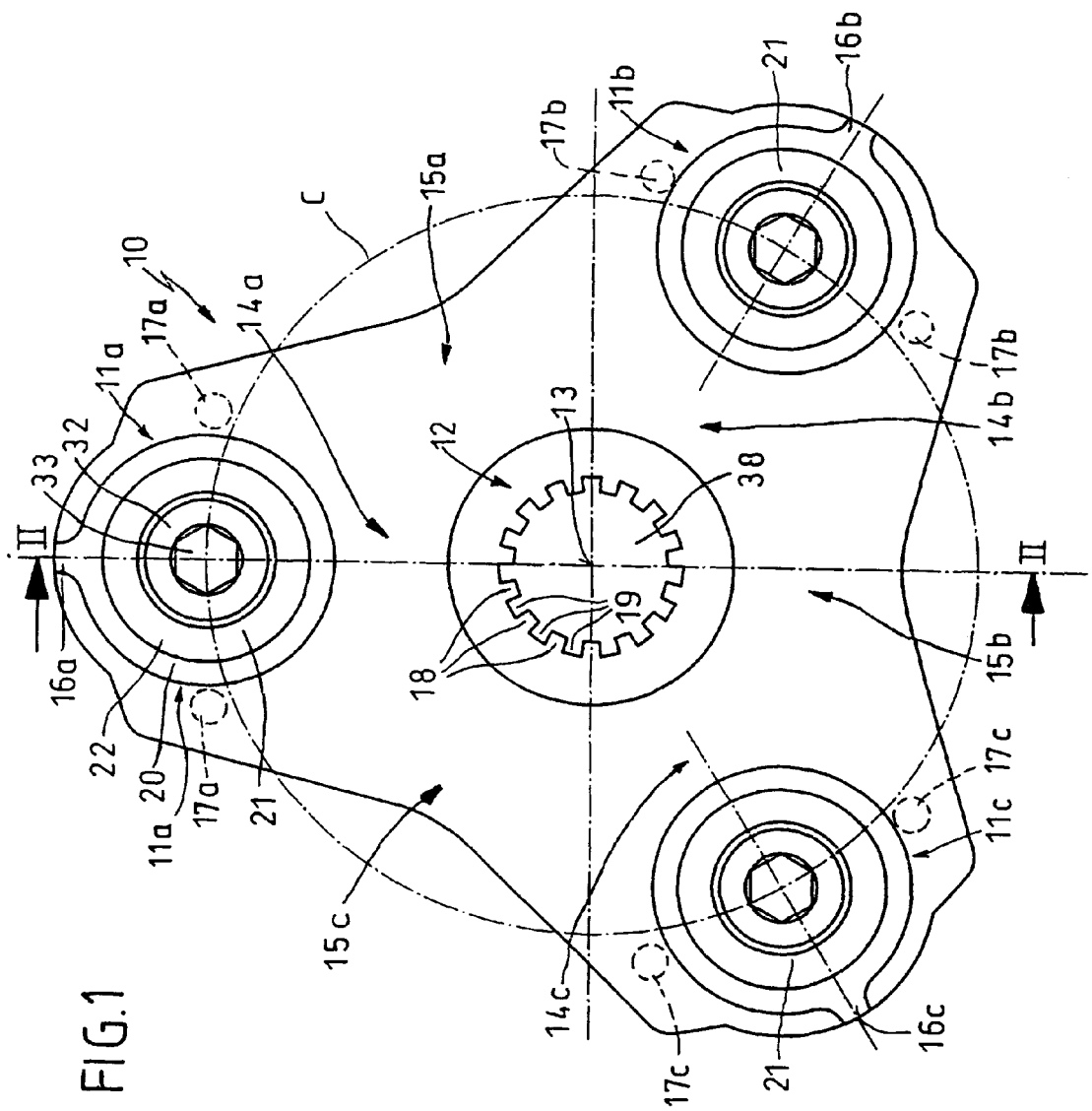
FIG. 1 is an end view of a rotary coupling according to the invention.
Figure 2:
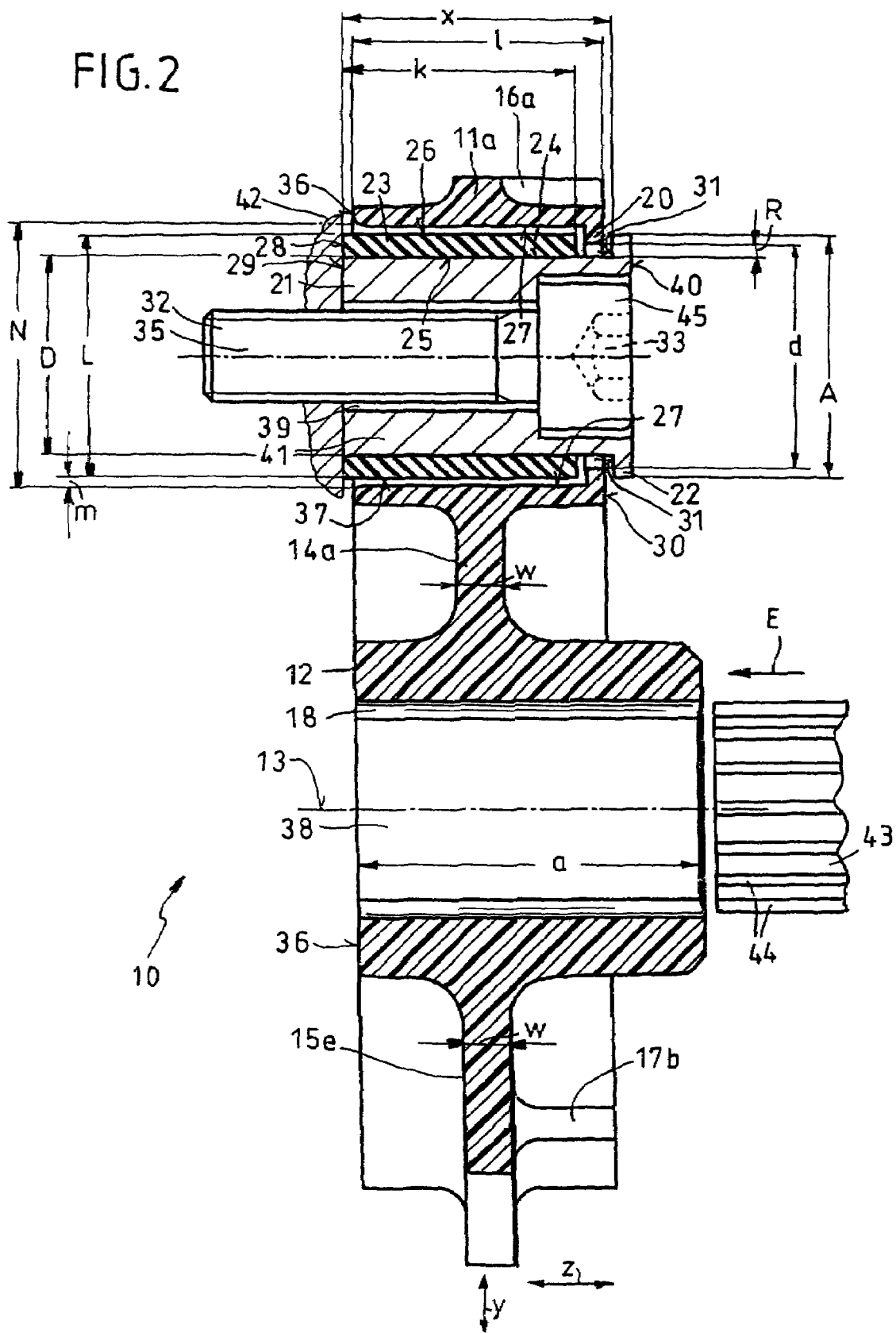
FIG. 2 is a partly diagrammatic section taken along line II-II of FIG. 1

As seen in FIGS. 1 and 2 a rotary coupling disk 10 comprises a central hub 12 centered on an axis 13 and having three identical connection regions or lobes 11a, 11b, and 11c that project radially outward and that are angularly equispaced, each formed as an eye having an axially throughgoing passage 37 centered on a circle C also centered on the axis 13. Webs 14a, 14b, and 14c of axial thickness w radially connect each lobe or part 11a, 11b, and 11c with the hub 12, and further webs 15a, 15b, and 15c angularly connect them together. The hub 12 is unitarily formed with the lobes 11a, 11b, and 11c, and with the webs 14a, 14b, 14c, 15a, 15b, and 15c of plastic reinforced with short glass fibers so as to have a rigidity comparable to that of a cast aluminum body. The coupling disk 10 can have more than three lobes so that with, for example, twelve lobes it would have a more circular than star shape.

The hub 12 defines an axially throughgoing passage 38 and is formed with radially inwardly projecting formations 18 here constituted as ridges or splines defining axially extending grooves 19. A shaft 43 (FIG. 2 only) can be inserted in an axial direction E into this passage 38 and has splines 44 that mate with the splines 18 to rotationally couple this shaft 43, which may be the input shaft of a hydraulic pump, with the hub 12. The hub 12 has an axial length a that is substantially greater than an axial thickness 1 of the rest of the coupling 10 between a back face 36 and a front face 30 of the lobes 11a-11c, which in turn is a multiple of the thickness w. Radially outwardly extending ridges 16a, 16b, and 16c and angularly extending ridges 17a, 17b, and 17c on the lobes 11a, 11b, and 11c further stiffen and reinforce this plastic part. Normally the disk 10 is formed by injection molding. To ensure that the splines 18 and grooves 19 are perfectly shaped, they can be made by material-removing machining of the cast part. Thus a cutting tool is passed axially through the cast part to make the splines 18 perfect.

As best seen in FIG. 2 the lobe 11a, which is identical to the lobes 11b and 11c, is formed with the cylindrical passage 37 extending parallel to the axis 13 and receiving a metallic element 21 formed as a cylindrical sleeve 41 having at its front end a radially outwardly projecting rim 22. Similarly the lobe 11a has at the front face 30 a radially inwardly projecting rim 20. An inside diameter d of the rim 20 is smaller than an outside diameter A of the rim 22 so that this rim 22 cannot pass in the direction E through the passage 37. Furthermore this diameter d is greater than an outside diameter D of the body 41 of the sleeve 21 so that the sleeve 21 can be inserted in the direction E into the passage 37.

In addition an elastic sleeve 23 is carried on the sleeve 21 and has an inside face 25 snugly engaged with a cylindrical outside face 24 of the sleeve 21 and an outside face 26 spaced inward from a cylindrical inner surface 27 of the passage 37. More particularly, the diameter D of the surface 24 is slightly greater than an inside diameter of the sleeve 23 in relaxed condition so this rubber sleeve 23 tightly grips the sleeve 21 when fitted over it, but an outside diameter L of the sleeve 23 is smaller than an inside diameter N of the passage 37 by a small radial play m which is less than a difference R between the diameter d and the diameter D of the body 41 of the sleeve 21 so that prior to securing the coupling 10 to a flywheel 42 (FIG. 2 only) the elastic sleeve 23 prevents the metal sleeve 21 from falling out of the passage 37 in a direction opposite the direction E.

The sleeve 21 has an axial length x between a back face 31 of its rim 22 and its back end 29 that is substantially longer than the thickness 1 of the coupling 10 at the lobes 11a, 11b, and 11c and that is also more than an axial length k of the sleeve 23. Thus when a back face 28 of the sleeve 23 is flush with a back face 29 of the sleeve 21, its front end is rearward of the rim 20. Since this dimension x is greater than the thickness 1, the rear faces 28 and 29 project past the rear face 36 of the coupling 10 even when the rear face 31 of the rim 22 is still forward of the front face 30 of the coupling. Thus, when the sleeve 21 is bolted to the flywheel 42, the back face 36 of the coupling disk 10 will still be spaced forward from this 10 flywheel 42. The axes of the shaft 43 and flywheel 42 therefore do not even have to be perfectly parallel to each other.

Prior to connection with the shaft 43 and flywheel 42, the sleeves 21 are loosely held in the passages 37. The radially outwardly projecting rim 22 prevents them from dropping out in is the direction E and opposite movement is blocked by the sleeves 23. A subassembly comprised basically of the plastic body or disk 10 with its sleeves or elements 21 held in place by the sleeves 23 thus can be delivered as a single unit to the repair shop, and can easily be handled without any worry about losing 20 parts, substantially simplifying replacing a worn-out coupling since the installer does not have to keep track of a handful of parts.

To mount the coupling 10 on the flywheel 42, bolts 32 each having a threaded shaft 35 and a head 45 with a countersink 25 33 are passed through a counterbore 39 in the sleeve 21 so that the bolt heads 45 are wholly rearward of a front face 40 of the sleeves 21. The bolts 32 are screwed into the flywheel 42 so that the rear faces 29 of the sleeves 21 are pressed directly against the font face of the flywheel 42 in solid metal-to-metal contact. There is still, however, some radial play as shown by arrow y between the outer surface 26 of the elastic sleeves 23 and the inner surfaces 27 so some misalignment between the axis of the shaft 43 and that of the flywheel 42 can be tolerated. Once the bolts 32 are all seated in the flywheel 42, the shaft 43 can simply be inserted in the direction E into the passage 38, and it is even acceptable to allow some relative axial shifting as shown by arrow z of the shaft 43 and hub 13 in use if desired.

The arrangement of FIGS. 3 and 4 is substantially identical to that of FIGS. 1 and 2 except that the sleeves 21 and bolts 32 are replaced by a one-piece element 34 having a cylindrical body 41 carrying the sleeve 23 and a threaded stud 35' that can be screwed into the flywheel 42.

It is also possible according to the invention to reduce the outside radial dimension of the coupling 10 by in effect cutting away the lobes 11a, 11b, and 11c away outside of a circle shown on lobe 11a in FIG. 3 at C' so that the passages 37 are actually axially extending but radially outwardly open slots. This eliminates the reinforcing ribs 16a, 16b, and 16c.

I claim:

1. A rotary coupling for connecting a drive part rotating about a drive-part axis with a driven part rotating about a driven-part axis generally coaxial with the drive-part axis, one of the parts being formed as a shaft with axially extending coupling formations, the coupling comprising:
 a one-piece cast plastic body formed with:
  a central hub formed with axially extending coupling formations complementary to the formations of the one part and fitted axially to the one part, and
  a plurality of connection regions distributed angularly from the hub, each formed with an axially throughgoing hole of predetermined inner diameter, and securable to the other of the parts;
 respective metallic elements fitted with play in the holes and each fixed to the other part; and
 respective elastic sleeves snugly surrounding the elements in the holes and having outer surfaces of smaller diameter than the inner diameters of the respective holes.

2. The rotary coupling defined in claim 1 wherein the shaft is steel.

3. A rotary coupling for connecting a shaft rotating about a shaft axis with a part rotating about a part axis generally coaxial with the shaft axis, the coupling comprising
 a body formed with
  a central hub on the shaft axis fixable to the shaft, and
  a plurality of radially extending lobes each formed with an axially throughgoing hole, the holes being angularly spaced about the shaft axis; and
 respective metallic elements extending axially with radial play all the way through the holes, fixed to the part, and each having on an axial front end remote from the part, a radially projecting rim spaced axially from a respective axial front face of the part, axially confronting a front face of the respective lobe, and of a diameter greater than a diameter of the respective hole at the respective lobe front face.

4. The rotary coupling defined in claim 3 wherein the hub is formed with axially extending and radially inwardly projecting coupling formations complementary to and fittable with axially extending and radially outwardly projecting coupling formations of the shaft.

5. The rotary coupling defined in claim 3 wherein the body is integrally formed of one piece of plastic.

6. The rotary coupling defined in claim 3 wherein the elements are metallic sleeves or bolts.

7. The rotary coupling defined in claim 3 wherein the elements each include a sleeve and a bolt engageable through the respective sleeve.

8. The rotary coupling defined in claim 3 wherein the elements are each unitarily formed with a threaded bolt engageable in the other part.

9. The rotary coupling defined in claim 3, further comprising
 reinforcing ribs rigidly securing the hub to the lobes.

10. The rotary coupling defined in claim 3, further comprising
 respective elastic sleeves snugly surrounding the elements in the holes, extending axially in the holes, and having outer surfaces of smaller diameters than inner diameters of the respective holes, the elements and sleeves being received with axial and radial play in the respective holes.

11. The rotary coupling defined in claim 10 wherein the body is one piece of molded plastic.

12. The rotary coupling defined in claim 10 wherein each lobe has between the rim of the respective metallic element and the front face of the part a radially inwardly projecting rim, the elastic sleeves having front ends remote from the part and spaced axially toward the front face of the part from the respective inwardly projecting rim.

13. A rotary coupling for connecting a shaft rotating about a shaft axis with a part rotating about a part axis generally coaxial with the shaft axis, the shaft being formed with axially extending coupling formations, the coupling comprising
 a one-piece plastic body formed with
  a central hub on the shaft axis and formed with axially extending coupling formations complementary to and fitted with the formations of the shaft, and
  a plurality of radially extending lobes each formed with an axially throughgoing hole, the holes being angularly equispaced about the shaft axis;
 respective metallic elements extending axially with all-around play all the way through the holes, fixed to the part, and each having on an axial end remote from the part a radially projecting rim spaced axially from a respective axial front face of the part, axially confronting a front face of the respective lobe, and of a diameter greater than a diameter of the respective hole at the respective lobe front face; and
 respective elastic sleeves snugly surrounding the elements in the holes, extending axially in the holes, and having outer surfaces of smaller diameters than inner diameters of the respective holes, the elements and sleeves being received with axial and radial play in the respective holes.

* * * * *